United States Patent
Karasawa et al.

(10) Patent No.: US 7,539,858 B2
(45) Date of Patent: May 26, 2009

(54) PACKET ENCRYPTION SUBSTITUTING DEVICE, METHOD THEREOF, AND PROGRAM RECORDING MEDIUM

(75) Inventors: Kei Karasawa, Tokyo (JP); Katsunori Matsuura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/550,216

(22) PCT Filed: Apr. 4, 2005

(86) PCT No.: PCT/JP2005/006624

§ 371 (c)(1), (2), (4) Date: Sep. 22, 2005

(87) PCT Pub. No.: WO2005/099170

PCT Pub. Date: Oct. 20, 2005

(65) Prior Publication Data

US 2006/0184789 A1  Aug. 17, 2006

(30) Foreign Application Priority Data

Apr. 5, 2004  (JP) ............................. 2004-111347
Apr. 14, 2004  (JP) ............................. 2004-119225

(51) Int. Cl.
*H04L 9/00* (2006.01)
*G06F 9/00* (2006.01)

(52) U.S. Cl. ........................ 713/153; 726/12; 709/204
(58) Field of Classification Search .................... 726/11
See application file for complete search history.

(56) References Cited

U.S. PATENT DOCUMENTS 6,081,900 A * 6/2000 Subramaniam et al. ....... 726/19

(Continued)

FOREIGN PATENT DOCUMENTS

JP  5-63681  3/1993

(Continued)

OTHER PUBLICATIONS

S. Kent and R. Atkinson: Network Working Group, RFC: 2401, pp. 1-50, Nov. 1998.

(Continued)

*Primary Examiner*—Christian LaForgia
(74) *Attorney, Agent, or Firm*—Oblon, Spivak, McClelland, Maier & Neustadt, P.C.

(57) ABSTRACT

When a packet is received from a counterpart apparatus 3 connected to the Internet 2, it is determined by a decryption determination part 16 whether to decrypt or bypass the received packet by referring to a filter information storage part 15 based on a sending source and sending destination IP addresses and port numbers and a protocol. If it is determined that decryption is to be performed, then the received packet is decrypted based on cryptographic communication channel information agreed in advance between the counterpart apparatus 3 and a terminal 5 which does not have an IPSec function, in a cryptographic communication channel information storage part 12, and sent to the terminal 5. The cryptographic communication channel information is used for establishing a packet communication channel in conformity with IPSec between the counterpart apparatus 3 and the terminal 5, and includes an identification number, protocol information about whether encryption processing or signature processing, a cryptographic algorithm or key information, IP addresses and port numbers, and the like. The counterpart can use a transport mode.

17 Claims, 8 Drawing Sheets

S21: REQUESTS CRYPTOGRAPHIC COMMUNICATION
S22: ACCEPTS CRYPTOGRAPHIC COMMUNICATION (SPECIFIES PROXY SERVER)
S23: REQUESTS SUBSTITUTION OF CRYPTOGRAPHIC COMMUNICATION
S24: ACCEPTS SUBSTITUTION OF CRYPTOGRAPHIC COMMUNICATION

U.S. PATENT DOCUMENTS

| | | | |
|---|---|---|---|
| 7,181,612 B1* | 2/2007 | Pellacuru et al. | 713/153 |
| 2002/0080753 A1* | 6/2002 | Lee | 370/338 |
| 2002/0080827 A1* | 6/2002 | Lee | 370/527 |
| 2003/0009597 A1* | 1/2003 | Joung | 709/249 |
| 2003/0198349 A1* | 10/2003 | Aizu et al. | 380/277 |
| 2003/0212901 A1 | 11/2003 | Mishra et al. | |
| 2004/0078573 A1* | 4/2004 | Matsuyama | 713/175 |
| 2004/0158712 A1* | 8/2004 | Lee et al. | 713/165 |
| 2005/0015462 A1* | 1/2005 | Lee et al. | 709/217 |
| 2005/0160161 A1* | 7/2005 | Barrett et al. | 709/223 |
| 2005/0169288 A1* | 8/2005 | Kamiwada et al. | 370/401 |
| 2005/0169473 A1* | 8/2005 | Candelore | 380/239 |
| 2005/0210072 A1* | 9/2005 | Bojinov et al. | 707/200 |

FOREIGN PATENT DOCUMENTS

| | | |
|---|---|---|
| JP | 6-37750 | 2/1994 |
| JP | 11-308264 | 11/1999 |
| JP | 2001-7849 | 1/2001 |
| JP | 2003-69597 | 3/2003 |
| JP | 2003-110628 | 4/2003 |
| JP | 2003-179592 | 6/2003 |
| JP | 2003-179627 | 6/2003 |
| JP | 2003-289299 | 10/2003 |
| JP | 2003-304227 | 10/2003 |
| JP | WO 2004/105333 A1 * | 12/2004 |

OTHER PUBLICATIONS

Kei Karasawa, et al., "A Detachable IPsec Device for Secure Consumer Communication", Consumer Communications and Networking Conference, XP010787717, Jan. 3, 2005, pp. 608-610.

* cited by examiner

SA INFORMATION

| TERMINAL IP ADDRESS | SPI | PROTOCOL | CRYPTOGRAPHIC ALGORITHM, KEY | MODE | COUNTERPART IP ADDRESS | EXISTENCE PERIOD |
|---|---|---|---|---|---|---|
| | | | | | | |

FIG. 2B

FILTER INFORMATION

| SENDING SOURCE IP ADDRESS | SENDING DESTINATION IP ADDRESS | PROTOCOL | SENDING SOURCE PORT NUMBER | SENDING DEST PORT NUMBER | PROCESSING INSTRUCTION |
|---|---|---|---|---|---|
| 10.0.0.1/32 | 10.0.0.*/24 | tcp | any | any | CRYPT PROCESSING |
| 10.0.0.2/32 | 10.0.1.*/24 | IPSec | N/A | N/A | BYPASS |
| 2001::1 | 2001::2 | udp | 137 | 137 | BYPASS |
| 2001::1/128 | 2001::2/128 | icmp | 135 | N/A | DISCARD |

FIG. 2C

PACKET

| IP ADD (SRC) | IP ADD (DST) | SPI | ICV etc. | PROTOCOL | PORT (SRC) | PORT (DST) | DATA |

ESP HEADER (OR AH HEADER): SPI | ICV etc.

HEADER INFORMATION PART HD

DATA PART DA

S21: REQUESTS CRYPTOGRAPHIC COMMUNICATION

S22: ACCEPTS CRYPTOGRAPHIC COMMUNICATION
(SPECIFIES PROXY SERVER)

S23: REQUESTS SUBSTITUTION OF CRYPTOGRAPHIC COMMUNICATION

S24: ACCEPTS SUBSTITUTION OF CRYPTOGRAPHIC COMMUNICATION

FIG. 8

PACKET ENCRYPTION SUBSTITUTING DEVICE, METHOD THEREOF, AND PROGRAM RECORDING MEDIUM

TECHNICAL FIELD

The present invention relates to a packet cryptographic processing proxy apparatus which is connected between a terminal and the Internet and is capable of performing cryptographic processing on cryptographically processed packets on behalf of the terminal in packet communication between a counterpart apparatus connected to the Internet and the terminal, a method therefor and a recording medium of a program.

BACKGROUND ART

Conventionally, as a standard for performing cryptographic communication via a network such as the Internet, IPSec (Security Architecture for Internet Protocol), which has been standardized by IETF (Internet Engineering Task Force), an organization for standardization of the Internet, and which is in conformity with provisions about frame configuration, encryption and decryption of data, falsification checking and the like, is shown in RFC (Request for Comments) 2401 (hereinafter referred to as Non-patent Literature 1). As other cryptographic communication protocol standards, there are SSL (Secure Sockets Layer), TLS (Transport Layer Security) and the like. According to these standards, agreement is made in advance on SA (Security Association) information such as encryption and decryption, signature and keys for verification, encryption and decryption algorithms, signature and verification algorithms, protocols and the like. The agreement on the SA information is performed in conformity with the IKE (Internet Key Exchange) protocol or the Handshake protocol, which are key exchange protocols.

The IPSec function is implemented on a terminal as required. In addition, the IPSec function is also implemented on a packet cryptographic processing proxy apparatus in a VPN (Virtual Private Network), a unique network which is constructed with the use of the Internet and for which IPSec is specified as the standard protocol. That is, for example, the IPSec function is provided in a gateway which connects the Internet and a LAN (Local Area Network), and the gateway performs cryptographic processing on packets on behalf of each terminal (hereinafter referred to as an internal terminal) connected to the LAN. That is, when performing communication with an internal terminal connected to the LAN without encrypting data, a terminal connected to the Internet (hereinafter referred to as an external apparatus or a counterpart apparatus) only has to set the IP address and the like of the internal terminal on the LAN into the packets. However, when encrypting data, the external apparatus sets the IP address and the like of the internal terminal on the LAN; generates a packet including the IP address and data; performs predetermined encryption for the entire packet; generates a packet by setting the IP address and the like of a gateway which also acts as a packet cryptographic processing proxy apparatus for the encrypted packet; and sends the packet. The gateway which has received this packet decrypts the packet and sends the decrypted packet to an internal terminal on the LAN based on the IP address indicated by the header. Accordingly, the gateway in this case also acts as a packet cryptographic processing proxy apparatus (referred to as a first conventional technique).

As such a packet cryptographic processing proxy apparatus, for example, Japanese Patent Application Laid Open No. 2003-304227 (hereinafter referred to as Patent Literature 1) shows such one that is connected to a closed-type network the accesses to which are restricted and substitutes cryptographic communication with a terminal (corresponding to an external apparatus) connected to an open-type network which is connected to the closed-type network via a gateway, on behalf of an internal terminal connected to the closed-type network (hereinafter referred to a second conventional technique).

Figure 8:
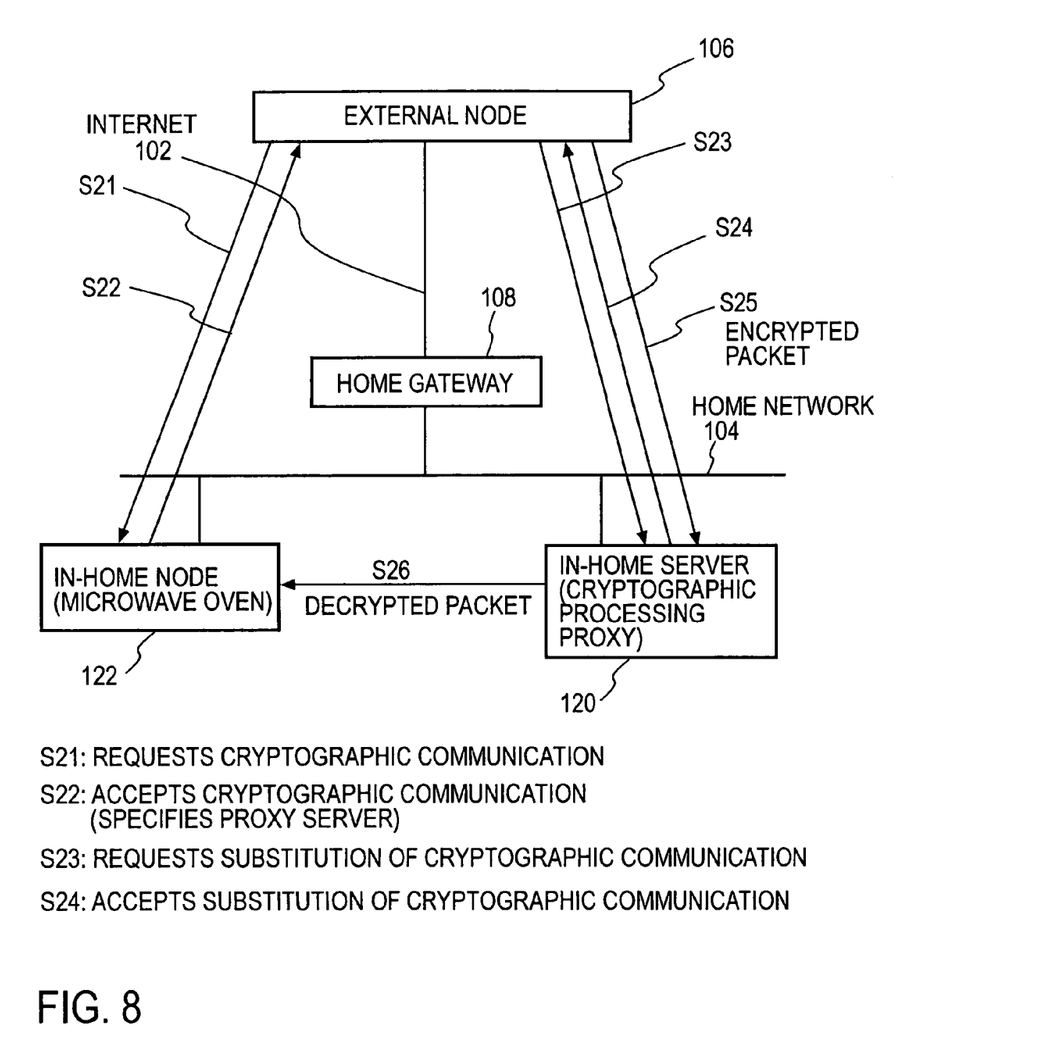
FIG. 8 is a diagram showing a system including a conventional packet cryptographic processing proxy server and a communication procedure for substituting cryptographic processing.

A conventional packet cryptographic processing proxy apparatus shown in this Patent Literature 1 will be described with reference to FIG. 8. As shown in FIG. 8, between an in-home node (internal terminal) 122 connected to a home network 104, which is a closed-type network, and an external node (external apparatus) 106 connected to the Internet 102, which is an open-type network, cryptographic communication is performed via a home gateway 108 which intervenes between the Internet 102 and the home network 104. The in-home node (in this case, a microwave oven) 122 is not provided with data processing performance enough to perform encryption and decryption processing. Therefore, a cryptographic-processing substitution in-home server 120 is connected to the home network 104 as a packet cryptographic processing proxy apparatus so that the in-home server 120 substitutes processing of data encryption and decryption for performing encrypted communication between the in-home node 122 and the external node 106, on behalf of the in-home node 122.

When the external node 106 activates cryptographic communication, the external node 106 sends a cryptographic communication request packet to the microwave oven 122, which is an in-home node, via the Internet 102, the home gateway 108 and the home network 104 (S21). Data in the cryptographic communication request packet is data required for the external node 106 to establish cryptographic communication with the microwave oven 122, which is an in-home node, and used for inquiring of the microwave oven 122. When receiving such a cryptographic communication request packet, the microwave oven 122 sends a cryptographic communication acceptance packet to the external node 106 through a reverse path (S22). Data in the cryptographic communication acceptance packet indicates acceptance of cryptographic communication and includes the network address of the in-home server 120 connected to the same home network 104.

The external node 106, which has received the cryptographic communication acceptance packet, sends a cryptographic communication substitution request packet to the in-home server 120, which is a specified cryptographic communication proxy server, via the Internet 102, the home gateway 108 and the home network 104 (S23). The in-home server 120, which has received the cryptographic communication substitution request packet, sends a cryptographic communication substitution acceptance packet to the external node 106 (S24). Thereby, the external node 106 confirms that cryptographic communication with the in-home node 122 is to be substituted. After confirming that the in-home server 120 is to substitute cryptographic communication with the in-home node 122 or by omitting all or a part of the confirmation, the external node 106 sends an encrypted data packet to the in-home server 120 in accordance with a predetermined procedure (S25). The in-home server 120, which has received the data packet encrypted in the predetermined procedure, decrypts the received data packet, and sends the decrypted data packet to the in-home node 122 (microwave oven), which should be an originally intended communication counterpart, via the home network 104 (S26). Thereby, the in-home node 122 (microwave oven) can realize cryptographic communication with the external node 106, which is the originally intended purpose, without processing ability for advanced encryption and decryption.

In order to execute a key exchange protocol in IPSec, communication is performed multiple times between apparatuses which mutually agree on SA information. Furthermore, a lot of computation processing amount is required by the communication, which imposes a considerable load on the apparatuses. If, to cope with this, an SA information agreement function is provided for a small-sized terminal in a home, such as electronic equipment provided with a cryptographic-processed communication function, the scale of hardware and software is increased, and the size and the price are also increased. From this point of view, it is proposed, for example, in Japanese Patent Application Laid Open No. 2003-179592 (hereinafter referred to as Patent Literature 2) that, though a terminal is provided with a cryptographic processing function, processing of agreeing on SA information is substituted by a key exchange proxy apparatus on behalf of the terminal. According to the key exchange substitution technique shown in this Patent Literature 2, when a terminal which is connected to a network and which is provided with a cryptographic processing function but is not provided with a key exchange function, performs packet cryptographic communication with a communication counterpart terminal which is connected to the network and provided with a key exchange function, the terminal first requests exchange of common keys to be used for a cryptographic communication signal with the communication counterpart terminal, from a key exchange proxy server connected to the network, and the key exchange proxy server performs key exchange processing with the communication counterpart terminal on behalf of the terminal based on the request and sets an agreed common key for the terminal. After that, the terminal uses the agreed common key to perform packet cryptographic communication with the communication counterpart terminal.

It is shown in Japanese Patent Application Laid Open No. 2003-289299 (hereinafter referred to as Patent Literature 3) to cause a gateway to perform such a key exchange substitution processing.

In the first conventional technique, when sending a packet to a terminal on a LAN without encrypting the packet, an external apparatus connected to the Internet only has to simply set the IP address of the terminal on the LAN. However, when encrypting and then sending a packet, the external apparatus is required to encrypt the packet, set the IP address or the like of a gateway (packet cryptographic processing proxy apparatus) for the encrypted packet as data, and then send the packet. That is, the termination of a packet which is not encrypted is the terminal on the LAN, and the termination of an encrypted packet is the gateway. Thus, it is necessary to set the IP address or the like of a gateway in the case of performing cryptographic communication, and it is troublesome to set, for communication with the same terminal, the IP address or the like of a gateway in addition to the IP address or the like of the terminal.

In the second conventional technique, the termination of an encrypted packet is the in-home server 120 which corresponds to the packet cryptographic processing proxy apparatus, and the termination of the sending destination of the packet is the terminal (microwave oven) 122. Therefore, when the in-home server 120 is introduced, a counterpart apparatus connected to the Internet is required to change setting information such as the IP address, depending on whether or not to use cryptographic communication, which presents a problem that the communication counterpart (a person who operates the counterpart apparatus) is required to perform troublesome setting, similarly to the first conventional technique. Furthermore, in this second conventional technique as described above, there is also a problem that it requires a lot of trouble to perform cryptographic communication, such as making a cryptographic communication request to the microwave oven 122 first, receiving specification of a proxy server, making a cryptographic communication substitution request again to the server 120 to receive its acceptance, and then sending an encrypted packet.

Patent Literature 1: Japanese Patent Application Laid Open No. 2003-304227
Patent Literature 2: Japanese Patent Application Laid Open No. 2003-179592
Patent Literature 3: Japanese Patent Application Laid Open No. 2003-289299
Non-patent Literature 1: RFC (Request for Comments) 2401

DISCLOSURE OF THE INVENTION

Issues to be Solved by the Invention

The present invention has been made to solve these problems, and its object is to provide a packet cryptographic processing proxy apparatus capable of substituting cryptographic processing for a terminal which is not implemented with a cryptographic processing function, without causing a communication counterpart to perform troublesome setting, a method therefor and a recording medium on which a program is recorded.

Means to Solve Issues

A packet cryptographic processing proxy apparatus according to this invention is connected between the Internet and a terminal and provided with a cryptographic communication channel information storage part and a cryptographic processing part. In the cryptographic communication channel information storage part, cryptographic communication channel information used for establishing a cryptographic communication channel at least for packet communication on the Internet, in packet communication between a counterpart apparatus connected to the Internet and the terminal. In the cryptographic processing part, cryptographic processing is performed for a received packet based on the cryptographic communication channel information stored in the cryptographic communication channel information storage part.

Effects of the Invention

As described above, according to the packet cryptographic processing proxy apparatus of this invention, since it is connected between a network and a terminal, a counterpart apparatus connected to the Internet, for example, can perform cryptographic processing, for example, decryption of a packet for which cryptographic processing has been performed, only by setting the IP address or the like of a terminal which is not provided with a cryptographic processing function. That is, the counterpart apparatus can employ a transport mode, and the user of the counterpart apparatus is not required to make settings such as the IP address of the terminal and the IP address of the packet cryptographic processing proxy apparatus and does not have to make such troublesome settings. It is also not necessary to do troublesome works of obtaining the IP address or the like of the cryptographic processing proxy server via communication with the terminal, and, after that, setting the IP address of the server to send a packet for which cryptographic processing has been performed to the cryptographic processing proxy server.

BEST MODES FOR CARRYING OUT THE INVENTION

Embodiments of this invention will be described below with reference to drawings.

First Embodiment

Figure 1:
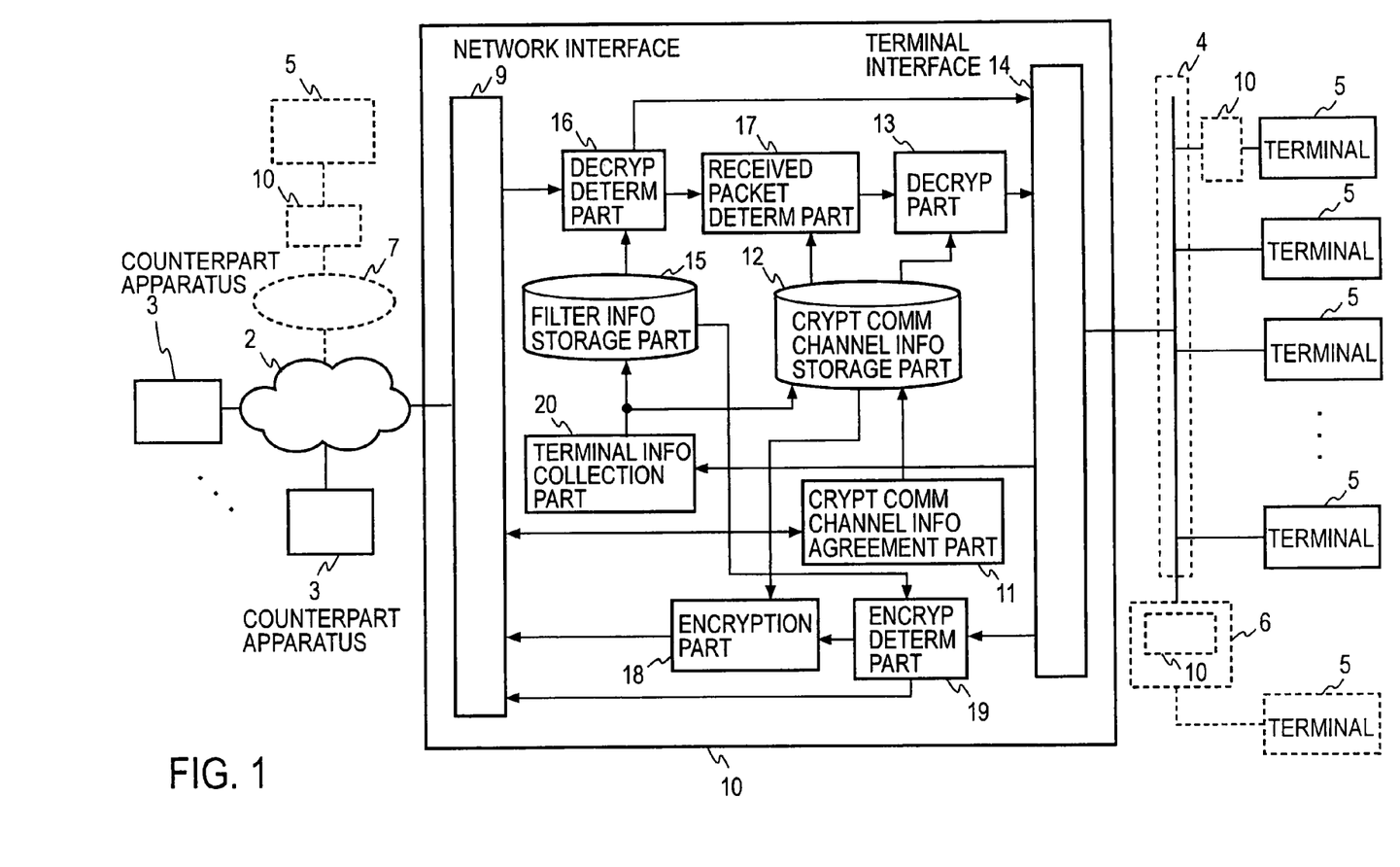
FIG. 1 is a block diagram showing an example of system configuration of a first embodiment of a packet cryptographic processing proxy apparatus according to this invention.

FIG. 1 is a block diagram showing an example of configuration of a system including a packet cryptographic processing proxy apparatus 1 according to a first embodiment of this invention. In the description below, a case where packet cryptographic processing is performed based on IPSec will be described as an example, and encryption processing and decryption processing will be described as examples of the cryptographic processing.

The packet cryptographic processing proxy apparatus 10 is connected to the Internet 2, and to the Internet 2, there is connected an external apparatus 3. The packet cryptographic processing proxy apparatus 10 is provided with a personal computer or a communication function and is connected to internal terminals 5 such as home electric equipment via a LAN 4. As internal terminals 5, there mixedly exist those which are implemented with an IPSec function, those which are not, those which are implemented with a cryptographic processing function but not with a key exchange function (a cryptographic communication channel information agreement function) and the like. In this example, the external apparatus 3 is assumed to be implemented with the IPSec function. That is, in this embodiment, the packet cryptographic processing proxy apparatus 10 is also used as a gateway for connecting the Internet 2 and the LAN 4.

The packet cryptographic processing proxy apparatus 10 is provided with a network interface 9 for communicating with an external apparatus 3 connected via the Internet 2; a cryptographic communication channel information agreement part 11 for agreeing on cryptographic communication channel information required for establishing a safe communication channel on the Internet 2 between the counterpart apparatus 3 and a terminal 5; a cryptographic communication channel information storage part 12 for storing agreed cryptographic communication channel information; a decryption part 13 for decrypting a packet encrypted in conformity with IPSec; and a terminal interface 14 for communicating with the terminals 5 and the like.

The cryptographic communication channel information is in conformity with IPSec. Prior to intended communication, negotiation for confirming a procedure enabling mutual communication, that is, agreement on the procedure is made by the cryptographic communication channel information agreement part 11, between the external apparatus 3 and the terminal 5. The cryptographic communication channel information as the result of the agreement is stored in the cryptographic communication channel information storage part 12.

Figure 2A:
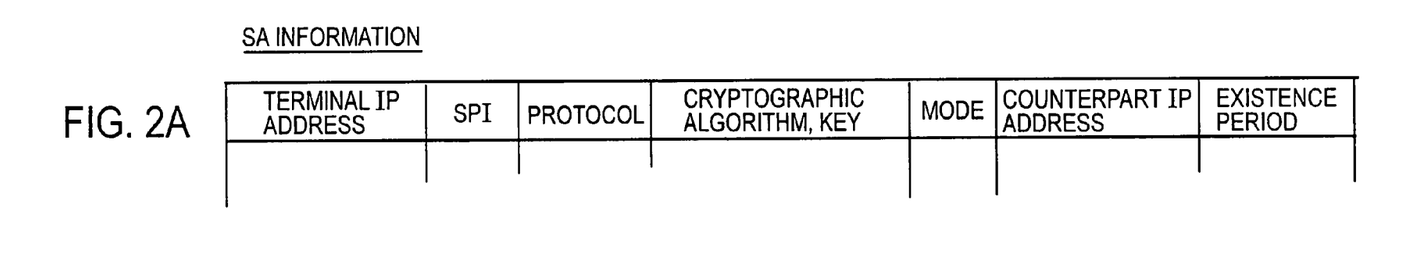
FIG. 2A is a diagram showing an example of SA information stored in a cryptographic communication channel information storage part 12 in FIG. 1.

The cryptographic communication channel information storage part 12 is configured by a non-volatile storage medium, for example. The cryptographic communication channel information (hereinafter referred to simply as "SA (Security Association) information") is that specified in Non-patent Literature 1. For example, as shown in FIG. 2A, it includes, in association with the IP address of a terminal which is a connection requester, (1) an identification number SPI (Security Parameter Index) assigned with a 32-bit integer value for identifying the SA information, inserted in each packet and indicating communication content in the packet, (2) security protocol information indicating information about any of the protocols of AH (Authentication Header), which is a protocol for transferring communication data while ensuring its data integrity and verifying the communication data, and ESP (Encapsulating Security Payload), which is a protocol for transferring communication data while keeping it confidential and releasing the confidentiality, (3) a cryptographic algorithm and cryptographic key information used in encryption and authentication, respectively, (4) mode information indicating any of modes of a tunnel mode, which is a mode for encrypting a received packet including the IP header and transferring it to a receiving destination, and a transport mode, which is a mode for encrypting data in a received packet, adding an IP header to it and then sending it to a receiving destination, (5) an identifier consisting of the IP address and port number of a counterpart; (6) SA information existence time indicating timing to change the SA information or the like; and the like. The port number is a number assigned to a service protocol standardized on the Internet.

In this embodiment, the mode information is the transport mode. However, if the packet cryptographic processing proxy apparatus 10 according to this invention is provided between a network in which terminals provided with the IPSec function are mixedly exist in addition to terminals without the IPSec function and the Internet, for example, then the mode information may be the tunnel mode or the transport mode. Furthermore, though ESP is used as the security protocol information in this embodiment, an AH protocol for preventing falsification of data, specifically, a protocol for digital signature and verification thereof may be used, for example.

Each parameter of SA information is to be agreed with a communication counterpart by means of a key exchange protocol such as IKE (Internet Key Exchange). The cryptographic communication channel information agreement part 11 agrees on each parameter of the SA information with a counterpart apparatus 3 on behalf of a terminal 5 and stores the SA information on which the agreed parameters are reflected in the cryptographic communication channel information storage part 12.

The decryption part 13 decrypts a packet encrypted in conformity with IPSec and sent to a terminal 5 by a counterpart apparatus 3 based on the cryptographic algorithm or cryptographic key information included in SA information stored in the cryptographic communication channel information storage part 12, without changing the sending source and the sending destination.

Furthermore, in this embodiment, the packet cryptographic processing proxy apparatus 10 is provided with a filter information storage part 15 for storing instruction information indicating processing to be performed for a packet as filter information in association with sending source identification information, sending destination identification information and packet transmission protocol information, and a decryption determination part 16 for determining whether or not to decrypt a packet sent by a counterpart apparatus 3 based on the filter information.

The decryption determination part 16 refers to the filter information stored in advance in the filter information storage part 15 in association with each terminal by a system administrator, determines whether the packet sent to a terminal 5 by a counterpart apparatus 3 should be decrypted (cryptographic processing) or immediately sent to the terminal 5 via the terminal interface 14 (bypassing) or discarded, and decides the processing of the packet based on the determination result. The bypassing is performed (1) when the terminal is not provided with the IPSec function; (2) when the terminal is provided with a cryptographic processing function but not with a key exchange function; or (3) when the data does not require cryptographic processing.

Figure 2B:
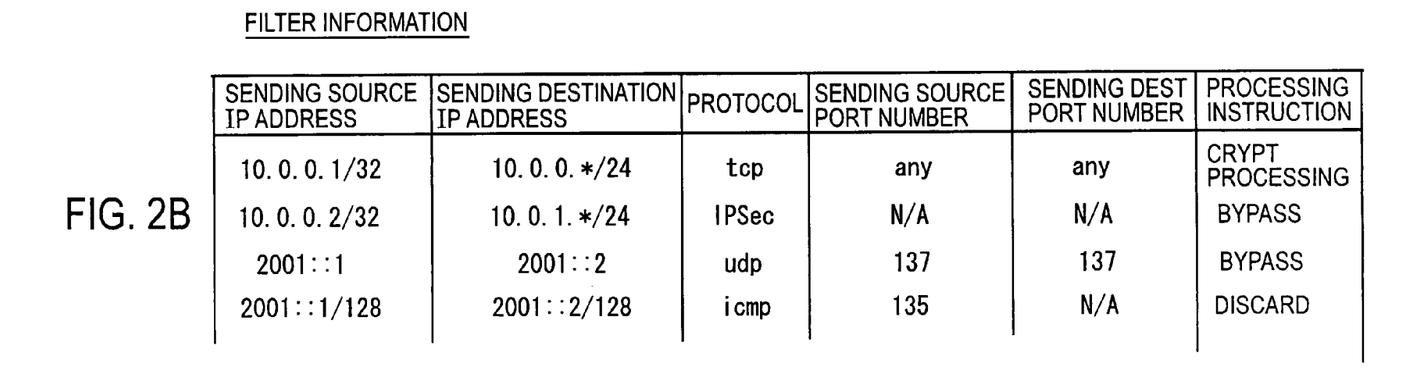
FIG. 2B is a diagram showing an example of filter information stored in a filter information storage part 15.

FIG. 2B is a table indicating an example of filter information. In FIG. 2B, the first column indicates the IP address of a sending source in sending source identification information for identifying the sending source of the packet; the second column indicates the IP address of a sending destination constituting sending destination identification information for identifying the sending destination of the packet; the third column indicates protocol information indicating a communication procedure for transferring the packet; the fourth column indicates the port number of the sending source in the sending source identification information; the fifth column indicates the port number of the sending destination in the sending destination identification information; and the sixth column indicates processing instruction information indicating how the packet should be processed.

As described above, the decryption determination part 16 refers to the filter information stored in advance in the filter information storage part 15 based on the filter information other than the processing instruction information in the received packet, and determines whether the packet sent to the terminal 5 should be decrypted or immediately sent via the terminal interface 14, or, additionally in this example, discarded, and decides the processing of the packet based on the determination result.

The filter information on the first line in FIG. 2B is information about a terminal which is not provided with the IPSec function. If the IP address is written in IPv4, the IP address of a sending source is 10.0.0.1/32 (with all the 32 bits specified), the IP address of a sending destination is 10.0.0.*/24 (with the higher 24 bits specified and with the lower 8 bits of any value between 0 to 255) and the protocol information indicates tcp (Transmission Control Protocol), which is a connection-oriented protocol which ensures reliability, then the processing instruction information indicates that cryptographic processing is to be performed for the packet sent by a counterpart apparatus 3 no matter what numbers the sending source port number and the sending destination port number are (any).

The filter information on the second line is an example of filter information about a terminal 5 having the functions of IPSec in conformity with various cryptographic processing provisions and indicates that a packet with a sending source IP address of 10.0.0.2/32 and a sending destination IP address of 10.0.1.*/24 for which cryptographic processing has been performed is immediately bypassed to the terminal 5.

In the filter information on the third line, IP addresses are written in IPv6. It is shown that, if the sending source IP address is 2001::1, the sending destination IP address is 2001::2, the protocol information indicates connectionless-oriented protocol udp (User Datagram Protocol) which allows packet loss such as in the case of distribution data of images or voices, and the sending source port number and the sending destination port number are 137, then the processing instruction information indicates that a packet which has been sent by a counterpart apparatus 3 and for which cryptographic processing has not been performed should be immediately sent to the terminal 5 via the terminal interface 14.

In the filter information on the fourth line, the sending source IP address is 2001::1/128; the sending destination IP address is 2001::2/128; and the protocol information indicates icmp (Internet Control Message Protocol), which is a protocol for controlling IP terminals. The processing instruction information indicates that the packet sent by a counterpart apparatus 3 should be discarded if the sending source port number is 135.

These pieces of filter information are only examples, and there is no relation between the identification information or the protocol information and the processing instruction information.

Figure 2C:
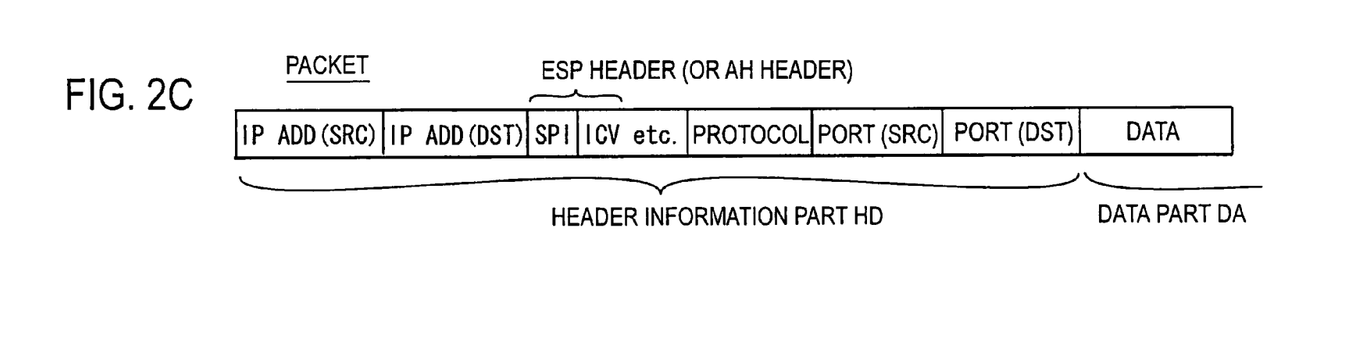
FIG. 2C is a diagram showing an example of packet configuration.

Each packet has a header information part HD including a sending source (SRC) IP address, a sending destination (DST) IP address, an extended header SPI+ICV called an ESP header or an AH header, a protocol, a sending source port number and a sending destination port number as shown in FIG. 2C, for example. A data part DA is added after the header information part HD. Whether or not cryptographic processing in conformity with IPSec has been performed for the data part DA is indicated by whether or not the extended header SPI+ICV is added.

If the processing instruction information indicates decryption as a result of referring to the filter information storage part 15 based on filter information in a received packet and, nonetheless, it is determined that an extended header is not added as a result of determination about whether or not the extended header is added by referring to the header information part HD in the received packet, that is, it is determined that cryptographic processing has not been performed in conformity with IPSec for the packet, then the decryption determination part 16 may discard the packet or immediately bypass the packet to a terminal 5.

The packet cryptographic processing proxy apparatus 10 is provided with a terminal information collection part 20 having an information collection protocol such as ARP (Address Resolution Protocol) and NDP (Neighbor Discovery Protocol) or a mutual connection function such as UPnP (Universal Plug and Play). The terminal information collection part 20 collects equipment information about terminals 5 connected to the packet cryptographic processing proxy apparatus 10, such as IP addresses and services, generates filter information including IP addresses, port numbers, a type of protocol and the like, as shown in FIG. 2B, based on the collected equipment information, and stores the filter information in the filter information storage part 15. The processing instruction in the filter information may be inputted by a system administrator.

A system administrator may update or delete a part or all of at least one of the cryptographic communication channel information and the filter information in the case of any change in the system configuration, such as the removal of a terminal 5, being made.

In this first embodiment, the packet cryptographic processing proxy apparatus 10 is further provided with a received packet determination part 17 which determines whether or not a packet sent by a counterpart apparatus 3 is valid prior to decryption processing when the decryption determination part 16 determines that decryption should be performed. The determination about the validity of a packet by the received packet determination part 17 is performed based on an integrity check value included in the packet encrypted in conformity with IPSec or a sequence number attached to the packet, which is specified in IPSec. The integrity check value (ICV) is calculated by an algorithm decided by an authentication algorithm. Even when the decryption determination part 16 refers to filter information and determines that the processing to be performed for a received packet is decryption, the packet may be immediately sent to a terminal 5 without performing decryption processing of the packet by the decryption part 13 if the received packet determination part 17 determines that cryptographic processing has not been performed for the packet from the header information of the packet.

Furthermore, in this embodiment, the packet cryptographic processing proxy apparatus 10 is provided with an encryption part 18 which encrypts a packet sent by a terminal 5 in conformity with IPSec, based on the SA information stored in the cryptographic communication channel information storage part 12, and an encryption determination part 19 which determines whether or not a packet sent by a terminal 5 should be encrypted by the encryption part 18, based on the filter information stored in the filter information storage part 15.

The encryption part 18 encrypts a packet to be sent to a counterpart apparatus 3 by a terminal 5 in conformity with IPSec, without changing the sending source and the sending destination of the packet, based on a cryptographic algorithm or cryptographic key information included in the SA information stored in the cryptographic communication channel information storage part 12.

The encryption determination part 19 refers to the filter information stored in the filter information storage part 15 based on a sending source IP address in filter information in a packet received from a terminal 5 to determine whether to encrypt and send the packet sent by the terminal 5, immediately send the packet to a counterpart apparatus 3 via the network interface 9 or discard the packet, and decide the processing of the packet based on the determination result. The filter information referred to by the encryption determination part 19 is similar to the filter information referred to by the decryption determination part 16, which has been described with the use of FIG. 2B, and therefore, description thereof will be omitted. However, even if the filter information is the same, the processing instruction information may be different. For example, as for a packet from a counterpart apparatus 3 to a terminal 5 and a packet from a terminal 5 to a counterpart apparatus 3, the former is to be decrypted, but the latter is not to be encrypted. The processing instruction information is thus decided individually.

By providing the encryption determination part 19 which refers to filter information, the packet cryptographic processing proxy apparatus 10 can prevent an invalid terminal, which is not intended (permitted) in advance, from connecting to a counterpart apparatus when multiple terminals are connected. Similarly, it is possible to prevent cryptographic processing from being performed with an invalid counterpart apparatus 3 which is not intended (permitted) in advance.

The operations of the packet cryptographic processing proxy apparatus 10 will be described below. In each operation of the packet cryptographic processing proxy apparatus 10, SA information on which parameters agreed by the cryptographic communication channel information agreement part 11 are reflected is assumed to be already stored in the cryptographic communication channel information storage part 12.

Figure 3:
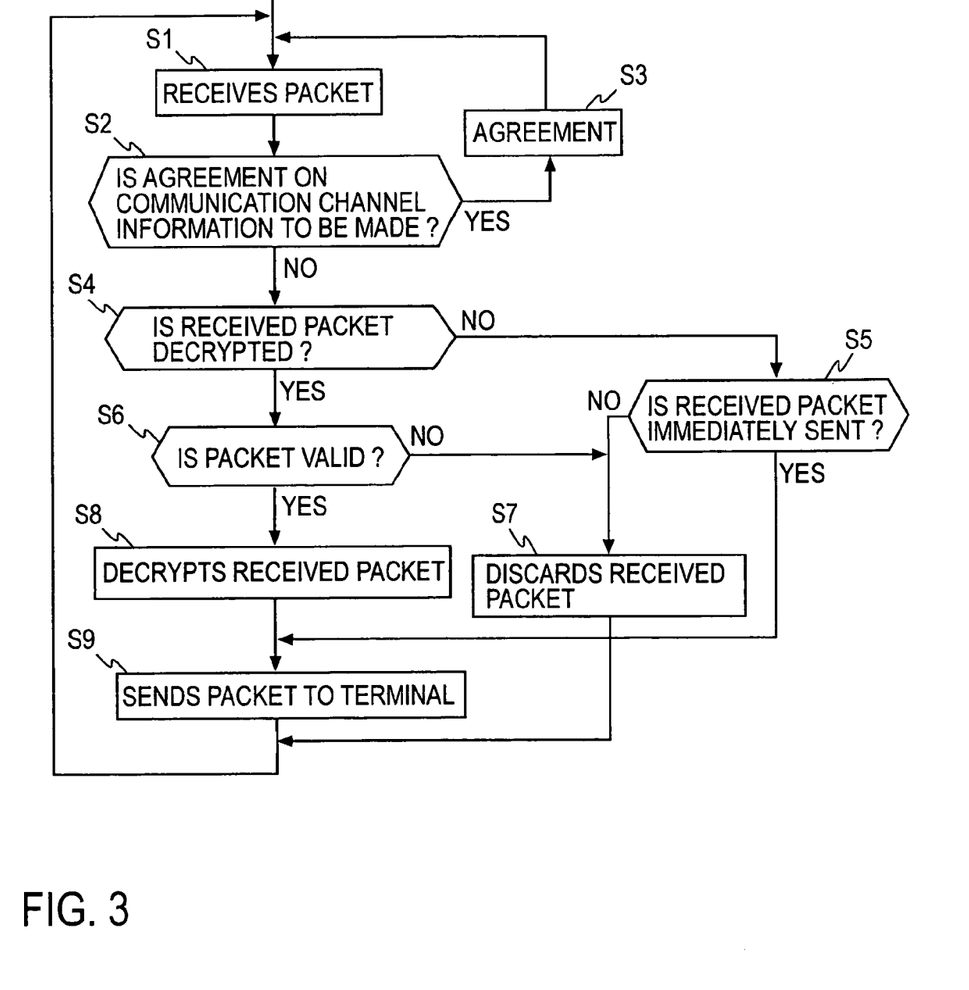
FIG. 3 is a flowchart showing an example of a procedure for processing a packet received from a counterpart apparatus according to the first embodiment of this invention.

FIG. 3 is a flowchart showing a process to be performed by the packet cryptographic processing proxy apparatus 10 for a received packed from a counterpart apparatus 3. When a packet is received at step S1, it is determined whether the packet requests agreement on communication channel information (SA information) (for example, exchange of cryptographic keys) (step S2). If it is requested, then at step S3, the communication channel information is agreed, and the agreed communication channel information is written to the cryptographic communication channel information storage part 12 in association with a terminal IP address. The process then returns to step S1 and receives the next packet.

If the received packets does not request agreement on cryptographic communication channel information at step S2, then the decryption determination part 16 refers to the filter information stored in the filter information storage part 15 based on filter information in the packet received via the network interface 9 to determine whether or not to decrypt the received packet (step S4). If it is not determined that the received packet is to be decrypted, then it is determined whether or not to immediately send the packet to a terminal 5 via the terminal interface 14 (step S5). If it is determined that the received packet is not to be immediately sent, then the received packet is discarded by the decryption determination part 16 (step S7).

If it is determined at step S4 that the packet is to be decrypted, then it is determined by the received packet determination part 17 whether or not the packet received via the network interface 9 is valid (step S6). If it is determined that the packet received via the network interface 9 is not valid, then the packet received via the network interface 9 is discarded by the received packet determination part 17 (step S7).

On the other hand, if it is determined at step S6 that the packet received via the network interface 9 is valid, then the packet received via the network interface 9 is decrypted by the decryption part 13 based on the SA information stored in the cryptographic communication channel information storage part 12 (step S8), and the decrypted packet is sent to the terminal 5 via the terminal interface 14 and the LAN 4 (step S9). The process returns to step S1 and receives the next packet.

If it is determined by the decryption determination part 16 at step S5 that the packet received via the network interface 9 is to be immediately sent to the terminal 5 via the terminal interface 14, then the packet received via the network interface 9 is immediately sent to the terminal 5 via the terminal interface 14 and the LAN 4 (step S9).

Figure 4:
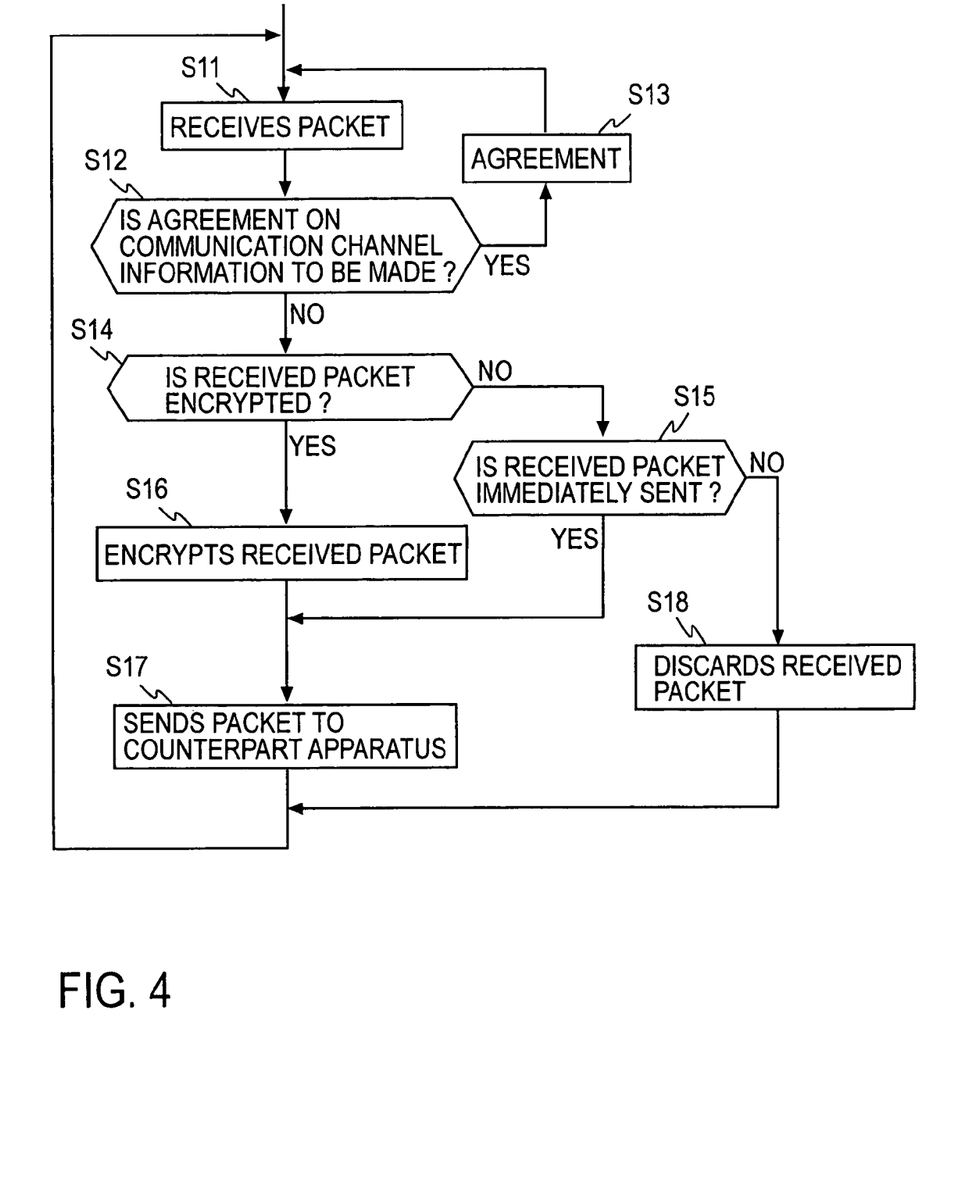
FIG. 4 is a flowchart showing an example of a procedure for processing a packet received from a terminal according to the first embodiment of this invention.

FIG. 4 is a flowchart of a process to be performed for a packet received by the packet cryptographic processing proxy apparatus 10 from a terminal 5. Similarly to the case of FIG. 3, when a packet is received at step S11, it is determined whether or not the packet requests agreement on cryptographic communication channel information (SA information) (for example, exchange of cryptographic keys (step S12). If the packets requests it, the cryptographic communication channel information is agreed with the counterpart apparatus 3 at step S13, and the agreed cryptographic communication channel information is written in the cryptographic communication channel information storage 12 in association with a terminal IP address. The process then returns to step S11 and receives the next packet.

If the received packet does not request agreement on cryptographic communication channel information at step S12, then the encryption determination part 19 refers to the filter information stored in the filter information storage part 15 based on filter information in the packet received via the terminal interface 14 to determine whether or not to encrypt the received packet (step S14). If it is determined that the packet is not to be encrypted, then it is determined whether or not to immediately send the packet to the counterpart apparatus 3 via the network interface 9 (step S15). If it is determined that the packet is not to be immediately sent, and it is determined that the packet is to be discarded, then the received packet is discarded by the encryption determination part 19 (step S18).

If it is determined at step S14 that the packet is to be encrypted, then the packet received via the terminal interface 14 is encrypted by the encryption part 18 in conformity with IPSec, based on the SA information stored in the cryptographic communication channel information storage part 12 (step S16), and the encrypted packet is sent to the counterpart apparatus 3 via the network interface 9 and the Internet 2 (step S17). The process then returns to step S11 and receives the next packet.

If it is determined by the encryption determination part 19 at step S15 that the packet received via the terminal interface 14 is to be immediately sent to the counterpart apparatus 3 via the network interface 9, then the packet received via the terminal interface 14 is sent to the counterpart apparatus 3 via the network interface 9 and the Internet 2 (step S17).

Second Embodiment

Figure 5:
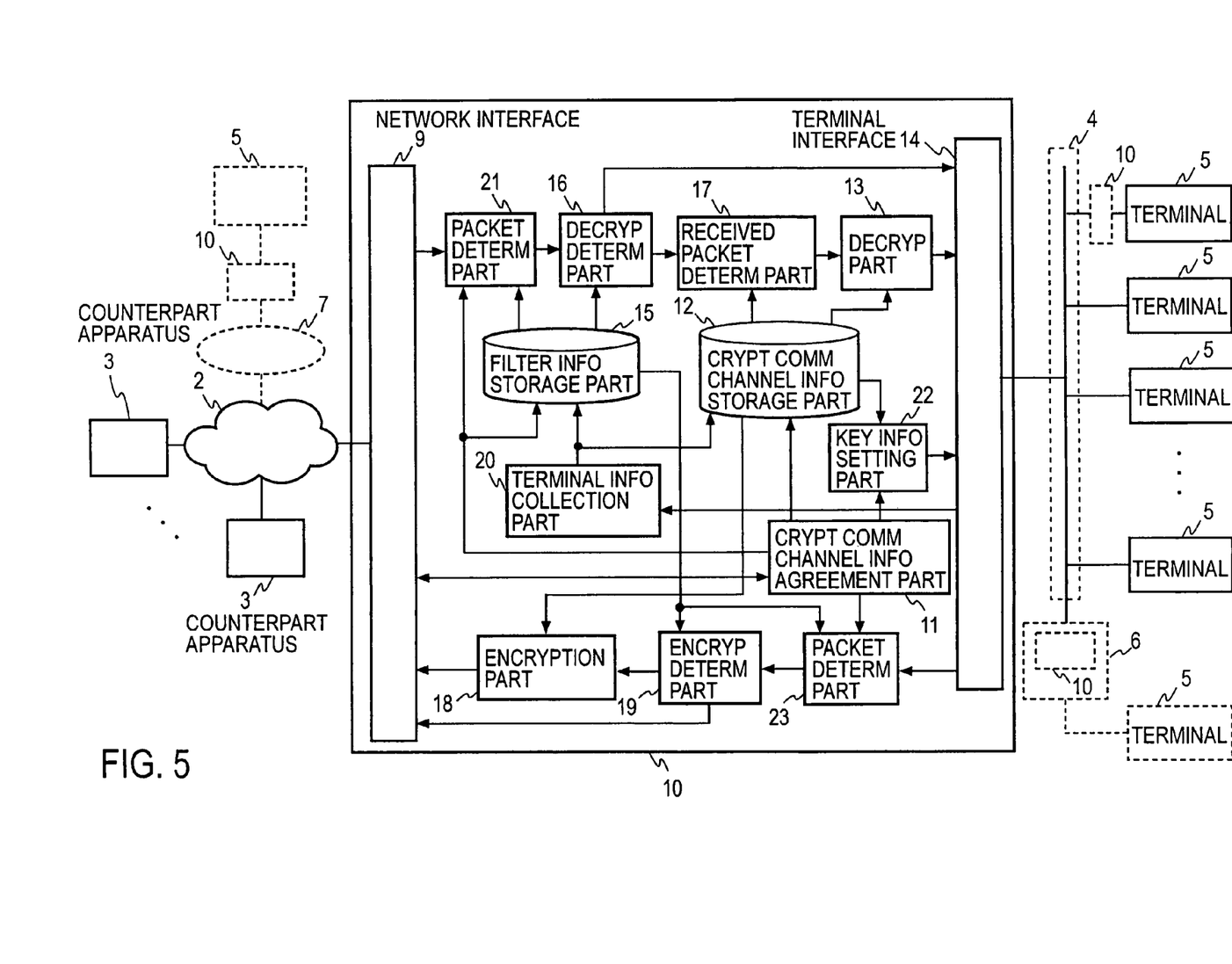
FIG. 5 is a block diagram showing an example of system configuration of a second embodiment of the packet cryptographic processing proxy apparatus according to this invention.

FIG. 5 shows a second embodiment of the packet cryptographic processing proxy apparatus of this invention. In this embodiment, the packet cryptographic processing proxy apparatus 10 in FIG. 1 is further added with a packet determination parts 21 and 23 and a key information setting part 22 in order to specifically perform the procedure for agreeing on cryptographic communication channel information to be performed by the cryptographic communication channel information agreement part 11 in the embodiment of FIG. 1. Therefore, the processing to be performed for a received packet is basically the same as the processing described with reference to FIGS. 3 and 4, and the description thereof will be omitted.

The packet determination part 21 determines whether or not a packet received from an external apparatus 3 requests agreement on cryptographic communication channel information. If it is requested, agreement on the cryptographic communication channel information with the external apparatus 3 is made by the cryptographic communication channel information agreement part 11, and the agreed cryptographic communication channel information (SA information) is written in the cryptographic communication channel information storage part 12. Key information in the written cryptographic communication channel information is sent to the terminal 5 corresponding to the sending destination IP address by the key information setting part 22 as required. The packet determination parts 23 determines whether or not the packet from a terminal 5 requests start of communication. If it is requested, agreement on cryptographic communication channel information with the external apparatus 3 is made by the cryptographic communication channel information agreement part 11, and the agreed cryptographic communication channel information (SA information) is written in the cryptographic communication channel information storage part 12. Key information in the written cryptographic communication channel information is sent by the key information setting part 22 to the terminal 5 corresponding to the sending destination IP address as required.

Figure 6:
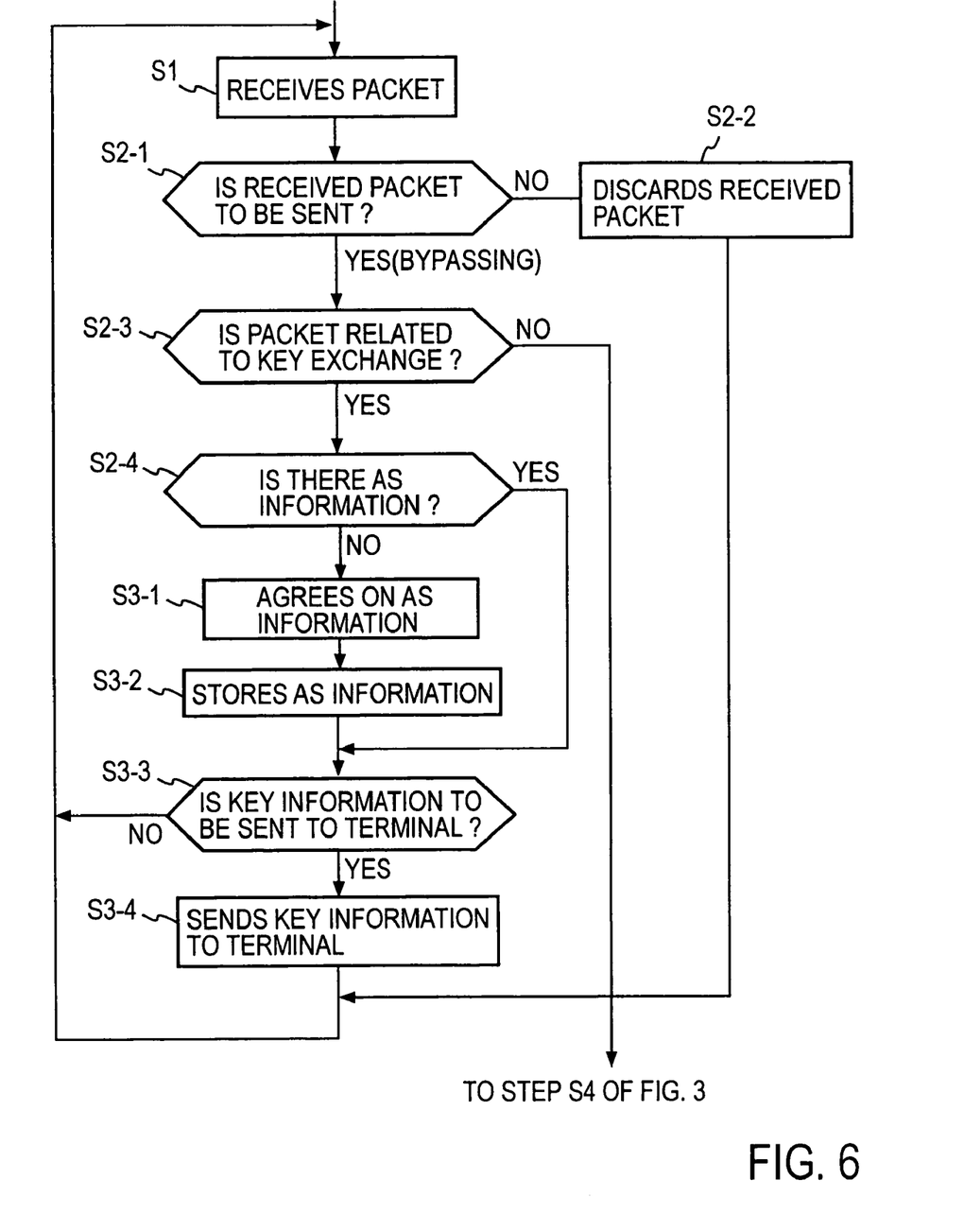
FIG. 6 is a flowchart showing an example of a procedure for agreeing on cryptographic communication channel information to be performed for a packet received from a counterpart apparatus according to the second embodiment.

FIG. 6 is a flowchart showing a process for agreeing on cryptographic communication channel information to be performed by the packet cryptographic processing proxy apparatus 10 for a packet received from a counterpart apparatus 3. The steps S2-1 to S2-4 show details of step S2 in FIG. 3, and steps S3-1 to S3-4 show details of step S3 in FIG. 3.

At step S1, when a packet is received from the counterpart apparatus 3, it is determined by the packet determination part 21 at step S2-1 whether or not the sending destination IP address of the received packet is stored in the filter information storage part 15 (step S2-1). If it is determined that the sending destination IP address is not stored, the received packet is discarded by the packet determination part 21 (step S2-2). On the other hand, if it is determined that the sending destination IP address of the packet is stored in the filter information storage part 15, it is determined by the packet determination part 21 whether or not the received packet is related to a request on agreement on cryptographic communication channel information (key exchange request) (step S2-3).

If it is determined at step S2-3 that the received packet is not related to a request on agreement on cryptographic communication channel information, then the process proceeds to step S4 in FIG. 3 and performs processing of the received packet through steps S4 to S9. On the other hand, if it is determined that the received packet is related to a request on agreement on cryptographic communication channel information, then it is determined at step S2-4 whether SA information with the same SA information identification number as that shown in the received packet and with a valid existence period is already stored in the cryptographic communication channel information storage part 12. If it is not stored, agreement on the cryptographic communication channel information with the counterpart apparatus 3 is made by the cryptographic communication channel information agreement part 11 at step S3-1.

The SA information agreed with the counterpart apparatus 3 at step S3-1 is stored in the cryptographic communication channel information storage part 12 at step S3-2, and at step S3-3, by referring to the filter information about the terminal corresponding to the sending destination IP address stored in the filter information storage part 15, it is determined whether or not the sending destination terminal is provided with a cryptographic processing function. In this determination, if the protocol in the filter information about a sending destination apparatus shown in FIG. 2B, for example, is tcp, and the processing instruction indicates bypassing, then the terminal is determined to have a cryptographic processing function. If the terminal is determined to be provided with a cryptographic processing function, then key information in the agreed SA information is sent by the key information setting part 22 to a terminal 5 via the terminal interface 14 at step S3-4, and the process then returns to step S1 and receives the next packet.

If it is determined at step S3-3 that the terminal is not provided with a cryptographic processing function, then the process immediately returns to step S1 and receives the next packet.

If it is determined at step S2-4 that valid SA information is stored, then the process proceeds to step S3-3 and performs processing similar to that described above. The terminal 5 performs encryption and decryption of a packet to be transmitted between the terminal 5 and the counterpart apparatus 3 with the use of a key indicated by key information given by the key information setting part 22. However, if the key information is not sent to the terminal 5 (that is, if the terminal is not provided with a cryptographic processing function), the packet cryptographic processing proxy apparatus 10 substitutes encryption and decryption of a packet to be transmitted between the terminal and the counterpart apparatus.

Figure 7:
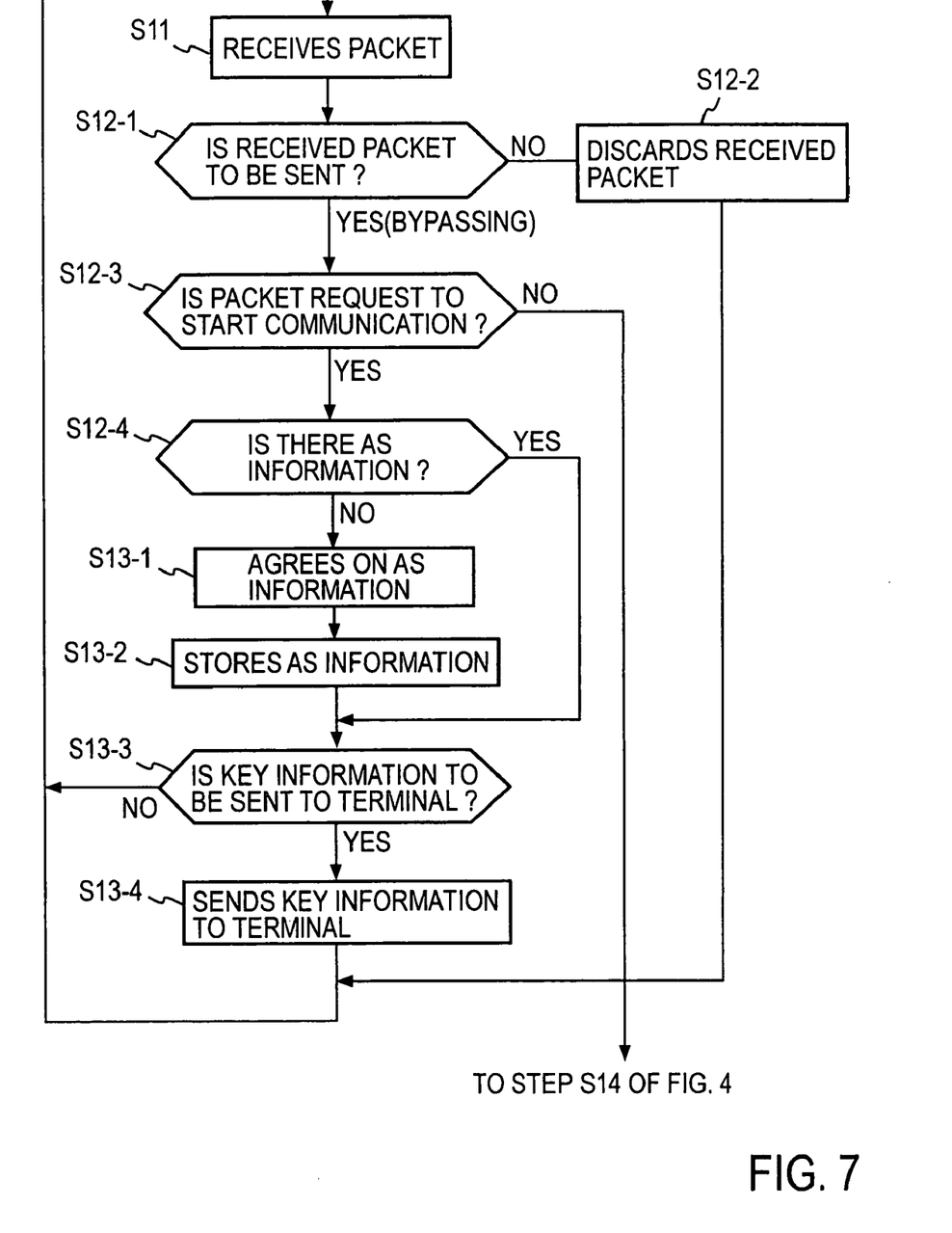
FIG. 7 is a flowchart showing an example of a procedure for agreeing on cryptographic communication channel information to be performed for a packet received from a terminal according to the second embodiment.

FIG. 7 is a flowchart showing a process for agreeing on cryptographic communication channel information to be performed for a packet received from a terminal 5, by the packet cryptographic processing proxy apparatus. Steps S12-1 to S12-4 in FIG. 7 show details of step S12 in FIG. 3, and steps S13-1 to S13-4 in FIG. 7 show details of step S13 in FIG. 4. The process of FIG. 7 is almost the same as that of FIG. 6.

When a packet is received from a terminal 5 at step S11, it is determined by the packet determination parts 23 at step S12-1 whether or not the sending source IP address of the received packet is stored in the filter information storage part 15. If it is determined that the sending source IP address is not stored, then the received packet is discarded by the packet determination parts 23 (step S12-2). On the other hand, if it is determined that the sending source IP address is stored in the filter information storage part 15, then it is determined by the packet determination parts 23 whether or not the received packet is related to a request to start communication (step S12-3).

If it is determined at step S12-3 that the packet does not indicate a request to start communication, then the process returns to step S14 in FIG. 4 and performs a cryptographic processing procedure for the received packet. On the other hand, if it is determined that the packet indicates a request to start communication, then it is determined at step S12-4 whether or not SA information corresponding to the IP addresses, the port numbers and the like shown in the header of the received packet is stored in the cryptographic communication channel information storage part 12. If it is not stored, then agreement is made by the cryptographic communication channel information agreement part 11 with a counterpart apparatus 3, at step S13-1.

The information agreed with the counterpart apparatus 3 at step S13-1 is stored in the cryptographic communication channel information storage part 12 at step S13-2. At step S13-3, by referring to filter information about the terminal 5 corresponding to the sending source IP address stored in the filter information storage part 15, it is determined whether or not the sending source terminal 5 is provided with a cryptographic processing function. In this determination, if the protocol in the filter information about a sending source apparatus shown in FIG. 2B, for example, is tcp, and the processing instruction indicates bypassing, then the terminal is determined to be provided with a cryptographic processing function. If the terminal is determined to have a cryptographic processing function, then key information in the agreed SA information is sent to the sending source terminal 5 by the key information setting part 22 via the terminal interface 14 at step S13-4. The process then returns to step S11 and receives the next packet.

If it is determined at step S13-3 that the terminal is not provided with a cryptographic processing function, then the process immediately returns to step S11 and receives the next packet.

If it is determined at step S12-4 that valid SA information is stored, then the process proceeds to step S13-3 and performs processing similar to that described above. The terminal 5 performs encryption and decryption of a packet to be transmitted between the terminal 5 and the counterpart apparatus 3 with the use of a key indicated by key information given by the key information setting part 22. However, if the key information is not sent to the terminal 5 (that is, if the terminal is not provided with a cryptographic processing function), the packet cryptographic processing proxy apparatus 10 substitutes encryption and decryption of a packet to be transmitted between the terminal and the counterpart apparatus.

As for each component of the packet cryptographic processing proxy apparatus 10 described above according to the first embodiment and the second embodiment, a program written to cause the above described operation to be performed may be executed by a processor. That is, the decryption part 13, the terminal information collection part 20, the decryption determination part 16, the received packet determination part 17, the encryption part 18 and the encryption determination part 19, additionally including the packet determination parts 21 and 23 in the case of the second embodiment, may be configured by a computer which executes the programs described above. In this case, the packet cryptographic processing substitution program can be installed in the computer from a recording medium such as a CD-ROM, a magnetic disk and a semiconductor storage device or the program can be downloaded to the computer via communication line into the computer, and executed by the computer.

Furthermore, at least one of the cryptographic communication channel information storage part 12 and the filter information storage part 15 may be configured by a tamper-proof, detachable device, such as an IC card, a USB (Universal Serial Bus) key and an SD (Secure Digital) memory card, so that at least part of stored information, for example, cryptographic key information, a user name and the like are not changed by users other than an intended (permitted) user.

Meanwhile, in at least one of the cryptographic communication channel information storage part 12 and the filter information storage part 15, at least a part of information stored therein may be changed if the user of the terminal 5 is a user authenticated through the Internet 2 or a system administrator. That is, for example, the packet cryptographic processing proxy apparatus 10 is assigned with an IP address for access, and an administrator accesses the packet cryptographic processing proxy apparatus 10 using the IP address from a terminal 5 and changes filter information stored in the filter information storage part 15. The IP address assigned to the packet cryptographic processing proxy apparatus 10 is not used for packet communication between a terminal 5 and a counterpart apparatus 3.

As described above, the packet cryptographic processing proxy apparatus 10 of this invention is provided in a gateway and connected to terminals 5. This packet cryptographic processing proxy apparatus 10 does not have an IP function. As described in FIGS. 3 and 4, it determines whether or not to perform cryptographic processing of a received packet. If the cryptographic processing is to be performed, it performs the cryptographic processing without changing the packet sending source and sending destination and sends the packet to the sending destination. If the cryptographic processing is not to be performed, it immediately transfers the packet to the sending destination. That is, it is not required to change the IP address nor use two IP addresses depending on whether or not cryptographic processing is to be performed, and it is different from a conventional packet cryptographic processing proxy apparatus provided in a gateway and provided with an IP function in this point.

The packet cryptographic processing proxy apparatus of this invention does not have to perform processing based on filter information. That is, it may only perform cryptographic processing. In this case also, when packet cryptographic communication is performed between a terminal without a cryptographic processing function and a counterpart apparatus, the counterpart apparatus only has to add the IP address of the terminal as a packet sending destination, and does not have to use the IP address of the cryptographic processing proxy apparatus.

This packet cryptographic processing proxy apparatus 10 of this invention only has to be connected between the Internet and terminals 5, and it may be connected between the LAN 4 and each terminal 5 as denoted by dashed lines in FIG. 1. In this case, the terminal 5 is mounted with a card for connection with a LAN, that is, a connection card having an IP function, and therefore, the packet cryptographic processing proxy apparatus 10 may be mounted on the LAN connection card.

The IPSec function is implemented as a part of an IP function. Accordingly, the IPSec function has been conventionally incorporated in the IP function of a gateway, or in the IP function of a terminal. However, in the packet cryptographic processing proxy apparatus 10 of this invention, the IPSec function is not incorporated in the IP function, and the simplest form of the packet cryptographic processing proxy apparatus 10 only has to possess the functions of the cryptographic communication channel information storage part 12 and the cryptographic processing parts (for example, the decryption part 13 and the encryption part 18). That is, the IPSec function is separated from the IP function, and it is simply for performing cryptographic processing and allowing passage without changing a sending destination and a sending source. Therefore, it is only necessary to simply set the IP address of a terminal into a packet, and it is not required to set both of the IP address of a terminal and the IP address of a packet cryptographic processing proxy apparatus into a packet nor to differently use IP addresses. Furthermore, it is also not required to troublesomely perform packet cryptographic processing after obtaining the IP address of a cryptographic processing proxy server.

Thus, the IPSec function of the packet cryptographic processing proxy apparatus 10 in the embodiments of this invention is not incorporated in the IP function, and therefore, it may be inserted into any position between the Internet 2 and terminals 5. For example, it may be inserted between the LAN 4 and the terminals 5 as denoted by dashed lines in FIG. 1 or 5. In this case, the communication function via the Internet which is mounted on the terminal 5, that is, the IP function may be implemented by implementing the packet cryptographic processing proxy apparatus 10 of this embodiment on a network interface device such as a wired LAN card or a wireless LAN card, and the apparatus 10 of this invention may be logically directly connected to the terminal 5.

Similarly, as in the case where a terminal 5 is connected to the LAN 4 via a two-port Ethernet® bridge 6, as denoted by dashed lines in FIG. 1 or 2, the packet cryptographic processing proxy apparatus 10 of this embodiment may be implemented on inter-network connection equipment 6 which does not have an IP address. That is, the apparatus 10 according to this invention may be implemented on a device 6 which is connected between the Internet and a terminal 5 and does not have an IP address. Furthermore, when a terminal 5 having an IP function, for example, an in-home personal computer is connected to the Internet 2 via a public communication network 7, as denoted by dashed lines in FIG. 1 or 5, this packet cryptographic processing proxy apparatus 10 of the first or second embodiment may be inserted between the terminal 5 and the public communication network 7. That is, even when the terminal 5 is logically directly connected to the Internet 2, this embodiment can be applied.

As describe above, the cryptographic processing in this invention is any of the following: processing of making data confidential, that is, performing encryption; processing of releasing the confidentiality of the confidential data, that is, performing decryption; processing of ensuring integrity of data, such as electronic signature; and processing of checking integrity, such as verification of the electronic signature. Accordingly, though the decryption part 13 and the encryption part 18 configure cryptographic processing means in FIGS. 1 and 5, for example, the cryptographic processing means are not limited to decryption and encryption but may be means for verifying an electronic signature and adding an electronic signature. Similarly, though the decryption determination part 16 and the encryption determination part 19 are provided as cryptographic processing determination means, the cryptographic processing means are not limited to determination about decryption and encryption but may perform determination about whether or not to verify an electronic signature or whether or not to attach an electronic signature.

This invention may be applied only to a packet received from a counterpart apparatus 3. On the other hand, this invention may be applied only to a packet received from a terminals 5. For example, in the former case, the encryption part 18 and the encryption determination part 19 in FIG. 1 are omitted, and a packet received at the terminal interface 14 is immediately sent to the network interface 9. In the latter case, the decryption determination part 16, the received packet determination part 17 and the decryption part 13 are omitted, and a packet received at the network interface 9 is immediately sent to the terminal interface 14. In the embodiment of FIG. 5, the packet determination parts 23 is further omitted in the former case, and the packet determination part 21, in the latter case.

The received packet determination part 17 in the configuration shown in FIGS. 1 and 5 may be omitted. That is, determination about validity of a received packet may be performed by the IP function of a terminal 5. However, if the received packet determination part 17 is provided, there is obtained an effect that wasteful decryption processing is not performed for an unnecessary packet.

The filter information storage part 15 and the decryption determination part 16 may be omitted. In this case, it is necessary that all packets to be sent to the terminals 5 should be packets for which cryptographic processing has been performed. However, if the filter information storage part 15 and the decryption determination part 16 are provided, it is possible to send a packet to a terminal 5 with or without performing cryptographic processing depending on the requirements requested for data of a packet, and it is not necessary to perform cryptographic processing for a packet which does not need the cryptographic processing. Thereby, the processing by a counterpart apparatus 3 is simplified. The filter information storage part 15 and the encryption determination part 19 can be similarly omitted. However, if the filter information storage part 15 and the encryption determination part 19 are provided, unnecessary cryptographic processing is similarly not performed, and the processing load imposed on the packet cryptographic processing proxy apparatus 10 is reduced.

If a packet cryptographic processing proxy apparatus 10 provided only with a cryptographic processing part and a cryptographic communication channel information storage part is provided immediately before terminals 5, it is also effective because data to be kept externally confidential, such as a user name and a device serial number, are encrypted. The terminal 5 may be, for example, a home electric appliance, such as an air conditioner, lighting equipment, a washing machine, a telephone set, a microwave oven, a television receiver and a personal computer, office electric equipment or any other electric equipment, which is provided with an IP function. The LAN 4 may be a wireless LAN or a wired LAN, and from a view point of application, it is a home network, an intra-company network, an intra-school network, a regional network, an intra-hospital network or the like.

Though cryptographic processing of a packet is performed in conformity with IPSec in the description above, cryptographic processing may be performed in conformity with other standards such as SSL (Secure Socket Layer) and TLS (Transport Layer Security).

What is claimed is:

1. A packet cryptographic processing proxy apparatus, comprising:
   a cryptographic communication channel information storage part which stores cryptographic communication channel information used for establishing a cryptographic communication channel at least for packet communication on the Internet between a counterpart apparatus connected to the Internet and the terminal;
   a cryptographic processing part which performs cryptographic processing for a received packet, which is forwarded from the counterpart apparatus to the terminal or from the terminal to the counterpart apparatus, based on the cryptographic communication channel information stored in said cryptographic communication channel information storage part;
   a packet determination part which determines whether the received packet requests agreement with the computer apparatus on cryptographic communication channel information for establishing a packet communication channel between the counterpart apparatus and the terminal; and
   a cryptographic communication channel information agreement part which, if the packet determination part determines that the received packet requests the agreement, makes the agreement and stores the agreed cryptographic communication channel information in said cryptographic communication channel information storage part,
   wherein the packet cryptographic processing proxy apparatus is connected between the Internet and the terminal and has no IP address.

2. The packet cryptographic processing proxy apparatus according to claim 1, further comprising:
   a filter information storage part which stores sending source identification information, sending destination identification information, protocol information indicating a packet communication procedure and processing instruction information indicating whether or not to perform cryptographic processing, as filter information; and
   cryptographic processing determination means for, by referring to said filter information storage part based on filter information in a packet received by the packet cryptographic processing apparatus, determining whether or not to perform cryptographic processing of the received packet by said cryptographic processing means based on the processing instruction information.

3. The packet cryptographic processing proxy apparatus according to claim 1, further comprising a received packet determination part which determines whether or not a packet received from the counterpart apparatus, which is forward to the terminal, is valid.

4. The packet cryptographic processing proxy apparatus according to claim 1, wherein said cryptographic communication channel information storage part includes a detachable, tamper-proof device in which at least part of the cryptographic communication channel information is stored.

5. The packet cryptographic processing proxy apparatus according to claim 1, wherein said cryptographic communication channel information storage part includes a storage medium in which at least part of the cryptographic communication channel information is changeable.

6. The packet cryptographic processing proxy apparatus according to any of claims 1 to 5, being logically directly connected to a network interface device of the terminal.

7. The packet cryptographic processing proxy apparatus according to any of claims 2 to 5, further comprising a terminal information collection part which collects a part of at least one of the cryptographic communication channel information and the filter information and stores the at least one of the cryptographic communication channel information and the filter information in said filter information storage part.

8. The packet cryptographic processing proxy apparatus according to claim 1, further comprising,
   a key information setting part which sets key information for performing cryptographic processing of a packet, in the cryptographic communication channel information agreed by said cryptographic communication channel information agreement part, for the terminal.

9. The packet cryptographic processing proxy apparatus according to claim 8, wherein, if determining necessity of agreement on cryptographic communication channel information, said packet determination part determines whether valid cryptographic communication channel information corresponding to the received packet is stored in said cryptographic communication channel information storage part, causes said key information setting part to set key information in the cryptographic communication channel information for the terminal if the valid cryptographic communication channel information is stored, and causes said cryptographic communication channel information agreement part to make agreement on cryptographic communication channel information if the valid cryptographic communication channel is not stored.

10. The packet cryptographic processing proxy apparatus according to claim 9, wherein, if said packet determination part determines necessity of agreement on the cryptographic communication channel information, and address information in the received packet is stored in said filter information storage part, said packet determination part causes agreement on the key information to be made.

11. The packet cryptographic processing proxy apparatus according to claim 10, further comprising a terminal information acquisition part which detects the terminal, acquires address information from the terminal and stores the acquired address information in said filter information storage part.

12. A packet cryptographic processing method implemented on a packet cryptographic processing proxy apparatus which is connected between the Internet and a terminal and which has no IP address, comprising the steps of:
- (a) storing cryptographic communication channel information used for establishing a cryptographic communication channel at least for packet communication on the Internet between a counterpart apparatus connected to the Internet and the terminal, in a cryptographic communication channel information storage part under agreement with the counterpart apparatus; and
- (b) performing cryptographic processing for a received packet, which is forwarded from the counterpart apparatus to the terminal or from the terminal to the counterpart apparatus, based on the cryptographic communication channel information;

wherein the step (a) comprises the steps of:
- (a-1) determined whether the received packet requests agreement with the counterpart apparatus on the cryptographic communication channel information and, if received packet requests agreement, making the agreement, for packet communication between the counterpart apparatus and the terminal on the cryptographic communication channel information; and
- (a-2) if received packet does not request agreement, bypassing or discarding the received packet.

13. The packet cryptographic processing method according to claim 12, wherein the step (b) comprises the steps of:
- (b-1) by referring to a filter information storage part based on filter information in the received packet, determining whether or not to perform cryptographic processing for the received packet; and
- (b-2) causing the cryptographic processing to be performed if it is determined by the determination that cryptographic processing is to be performed, and causing the received packet to immediately pass or to be discarded if it is determined by the determination that cryptographic processing is not to be performed.

14. The packet cryptographic processing method according to claim 12, wherein the step (a) comprises:
- (a-3) setting the agreed cryptographic communication channel information for the terminal.

15. The packet cryptographic processing method according to claim 12, wherein the step (a-1) comprises the steps of:
- (a-1-1) determining whether valid cryptographic communication channel information corresponding to the received packet is stored in the cryptographic communication channel information storage means; and
- (a-1-2) if the cryptographic communication channel information is stored, setting key information in the cryptographic communication channel information for the terminal; and, if the cryptographic communication channel information is not stored, making agreement on the cryptographic communication channel information, storing the agreed cryptographic communication channel information in the cryptographic communication channel information storage part as well as setting the agreed cryptographic communication channel information for the terminal.

16. The packet cryptographic processing method according to claim 15, wherein the step (a-1-1) comprises a step of, if agreement on cryptographic communication channel information for the packet is required, determining first whether address information in the received packet is stored in a filter information storage part; and, if the address information is stored, performing the determination about whether valid cryptographic communication channel information is stored in the cryptographic communication channel information storage part.

17. A computer readable storage medium encoded with computer executable instructions, which when executed by a packet cryptographic processing proxy apparatus which is connected between the Internet and a terminal and which has no IP address, cause the packet cryptographic communication processing proxy apparatus to perform a method comprising:
- (a) storing cryptographic communication channel information used for establishing a cryptographic communication channel at least for packet communication on the Internet between a counterpart apparatus connected to the Internet and the terminal, in a cryptographic communication channel information storage part under agreement with the counterpart apparatus; and
- (b) performing cryptographic processing for a received packet, which is forward from the counterpart apparatus to the terminal to the counterpart apparatus, based on the cryptographic communication channel information;

wherein the step (a) comprises the steps of:
- (a-1) determined whether the received packet request agreement with the counterpart apparatus on the cryptographic communication channel information and, if the received packet request agreement, making the agreement, for packet communication between the counterpart apparatus and the terminal on the cryptographic communication channel information; and
- (a-2) if the received packet does not request agreement, bypassing or discarding the received packet.

* * * * *